United States Patent
Zhu

(10) Patent No.: US 12,301,513 B2
(45) Date of Patent: *May 13, 2025

(54) CHANNEL INDICATION METHODS AND APPARATUSES

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/440,936

(22) Filed: Feb. 13, 2024

(65) Prior Publication Data

US 2024/0187197 A1 Jun. 6, 2024

Related U.S. Application Data

(63) Continuation of application No. 17/598,192, filed as application No. PCT/CN2019/079918 on Mar. 27, 2019, now Pat. No. 11,943,173.

(51) Int. Cl.
*H04W 72/12* (2023.01)
*H04L 1/00* (2006.01)
*H04L 5/00* (2006.01)

(52) U.S. Cl.
CPC .......... *H04L 5/0092* (2013.01); *H04L 1/0061* (2013.01)

(58) Field of Classification Search
CPC . H04L 5/00; H04L 5/0092; H04L 1/00; H04L 1/0061; H04W 72/1263
See application file for complete search history.

(56) References Cited

U.S. PATENT DOCUMENTS 9,826,537 B2 * 11/2017 Forenza ............ H04L 25/03891
10,367,613 B2 * 7/2019 Zhou ................. H04W 72/1263
(Continued)

FOREIGN PATENT DOCUMENTS

CN 104507108 A 4/2015
CN 105634703 A 6/2016
(Continued)

OTHER PUBLICATIONS

The State Intellectual Property Offce of the People's Republic of China, Offce Action and Search Report Issued in Application No. 201980000546.8, May 26, 2021, Submitted with Machine/Partial Translaton,(27P).
(Continued)

*Primary Examiner* — Hai V Nguyen
(74) *Attorney, Agent, or Firm* — Arch & Lake LLP; Hao Tan; Shen Wang

(57) ABSTRACT

A channel indication method includes: determining, by a base station on an unlicensed spectrum, one or more first subbands that pass a channel access; generating, by the base station, a channel indication signal to indicate the one or more first subbands that pass the channel access; and transmitting, by the base station, the channel indication signal to a terminal to determine, based on the channel indication signal, the one or more first subbands that pass the channel access. The channel indication signal comprises downlink control information (DCI), and at least one information field in the DCI indicates the one or more first subbands that pass the channel access.

15 Claims, 12 Drawing Sheets

Base Station 11    Terminal 12

(56) References Cited

U.S. PATENT DOCUMENTS

| | | | |
|---|---|---|---|
| 10,462,782 B2* | 10/2019 | Cui | H04W 16/14 |
| 11,076,387 B2* | 7/2021 | Oh | H04W 72/21 |
| 11,218,277 B2* | 1/2022 | Li | H04L 5/0007 |
| 11,350,451 B2* | 5/2022 | Pao | H04L 1/0038 |
| 11,412,533 B2* | 8/2022 | Wu | H04W 72/23 |
| 11,943,173 B2* | 3/2024 | Zhu | H04L 5/0092 |
| 2014/0269300 A1* | 9/2014 | Bennis | H04W 28/082 |
| | | | 370/235 |
| 2015/0351115 A1* | 12/2015 | Jeon | H04W 48/16 |
| | | | 455/450 |
| 2017/0013641 A1* | 1/2017 | Patel | H04W 72/1268 |
| 2017/0324524 A1* | 11/2017 | Zhou | H04L 5/0094 |
| 2018/0020437 A1* | 1/2018 | Cui | H04W 16/14 |
| 2018/0332576 A1* | 11/2018 | Oh | H04W 74/08 |
| 2018/0376494 A1 | 12/2018 | Hu et al. | |
| 2019/0021097 A1* | 1/2019 | Li | H04W 72/21 |
| 2019/0029054 A1 | 1/2019 | Li et al. | |
| 2019/0081763 A1* | 3/2019 | Akkarakaran | H04L 1/0026 |
| 2019/0174545 A1* | 6/2019 | Li | H04W 52/143 |
| 2019/0312763 A1* | 10/2019 | Lei | H04L 5/0026 |
| 2019/0380149 A1 | 12/2019 | Jiang et al. | |
| 2020/0068546 A1* | 2/2020 | Wu | H04W 16/14 |
| 2020/0084759 A1* | 3/2020 | Liu | H04L 1/1671 |
| 2020/0112484 A1* | 4/2020 | Sun | H04L 1/0038 |
| 2020/0120693 A1* | 4/2020 | Wu | H04W 72/1263 |
| 2020/0154446 A1* | 5/2020 | Yerramalli | H04W 72/23 |
| 2020/0154475 A1* | 5/2020 | Pao | H04L 5/0094 |
| 2020/0221495 A1* | 7/2020 | Chen | H04W 36/00837 |
| 2021/0051719 A1* | 2/2021 | Bhattad | H04W 74/006 |
| 2021/0075579 A1* | 3/2021 | Liu | H04L 5/0098 |
| 2021/0168663 A1* | 6/2021 | Lin | H04L 5/001 |
| 2021/0195649 A1* | 6/2021 | Xue | H04W 72/20 |
| 2021/0242988 A1* | 8/2021 | Kwak | H04B 7/0626 |
| 2021/0297995 A1* | 9/2021 | Li | H04W 74/0816 |
| 2021/0352672 A1* | 11/2021 | Wu | H04W 16/14 |
| 2021/0368530 A1* | 11/2021 | Wu | H04W 16/14 |
| 2022/0159709 A1* | 5/2022 | Xue | H04W 74/002 |
| 2022/0174650 A1* | 6/2022 | Zhu | H04W 72/23 |
| 2022/0232630 A1* | 7/2022 | Zhu | H04W 74/006 |
| 2022/0279556 A1* | 9/2022 | Wu | H04W 72/21 |
| 2023/0129493 A1* | 4/2023 | Kiilerich Pratas | |
| | | | H04W 74/0808 |
| | | | 370/235 |

FOREIGN PATENT DOCUMENTS

| | | | | |
|---|---|---|---|---|
| CN | 105722240 A | 6/2016 | | |
| CN | 106034309 A | 10/2016 | | |
| CN | 106160967 A | 11/2016 | | |
| CN | 107027127 A | 8/2017 | | |
| CN | 108029032 A | 5/2018 | | |
| CN | 108076522 A | 5/2018 | | |
| CN | 108886461 A | 11/2018 | | |
| CN | 108886788 A | 11/2018 | | |
| CN | 109075960 A | 12/2018 | | |
| CN | 109155702 A | 1/2019 | | |
| CN | 109309923 A | 2/2019 | | |
| CN | 109314989 A | 2/2019 | | |
| CN | 109328482 A | 2/2019 | | |
| EP | 3399663 A1 | 11/2018 | | |
| WO | WO-2018228600 A1 * | 12/2018 | | H04L 5/0005 |

OTHER PUBLICATIONS

MediaTek Inc"On downlink transmission detecion in NR-U" 3GPP TSG RAN WGI Aug. 24, 2018 Meeting #94 RI-1808272, Aug. 20-24, 2018,(6P).

Qualcomm Incorporated "Channel access procedures for NR unlicensed" 3GPP TSG RAN WG1 Meeting #95 R1-1813413, Nov. 12-16, 2018, (10P).

Extended European Search Report Issued in Application No. 19920812.5 Mar. 14, 2022,(7P).

The State Intellectual Property Office of People's Republic of China, The Second Office Action in Application No. 201980000546.8 dated Nov. 16, 2021,(16P).

Intellectual Property India, Office Action issued in Indian Application No. 202147046837 dated Mar. 28, 2022,(8p).

The State Intellectual Property Office of the People's Republic of China, Written Opinion of the International Searching Authority Issued in Application No. PCT/CN2019/079918, Dec. 27, 2019, WIPO (8P).

International Search Report issued in the International Application No. PCT/CN2019/079918, Sep. 27, 2019 and English translation,(4P).

* cited by examiner

| Downlink Signal Sequence Values | Channel Detection Subbands Passing the Channel Detection |
|---|---|
| DMRS sequence 1 | channel detection subband 1 |
| DMRS sequence 2 | channel detection subband 2 |
| DMRS sequence 3 | channel detection subband 3 |
| DMRS sequence 4 | channel detection subbands 1 and 2 |
| DMRS sequence 5 | channel detection subbands 1, 2, 3 and 4 |
| ... | ... |

CHANNEL INDICATION METHODS AND APPARATUSES

REFERENCE TO RELATED APPLICATIONS

This application is a continuation of U.S. application Ser. No. 17/598,192 filed on Sep. 24, 2021, which is a U.S. national stage of International Application No. PCT/CN2019/079918 filed on Mar. 27, 2019. The disclosures of the above-referenced applications are hereby incorporated by reference in their entirety.

TECHNICAL FIELD

The present disclosure relates to the field of communication technology, and in particular, relates to a channel indication method and apparatus.

BACKGROUND OF THE INVENTION

A communication system of new generation is expected to support a flexible configuration of multiple types of services corresponding to different service requirements. For example, enhanced Mobile Broad Band (eMBB), as a type of service, mainly focuses on the requirements of wide bandwidth, high-speed rate, etc.; Ultra Reliable Low Latency Communication (URLLC), as another type of service, mainly focuses on the requirements of high reliability and low latency; and massive Machine Type Communication (mMTC), as another type of service, mainly focuses on the requirements of a large number of connections. However, with the service requirements developing, just utilizing a licensed spectrum may not be enough to satisfy the increasing service requirements in the communication system of new generation.

SUMMARY OF THE INVENTION

In view of the above, examples of the present disclosure provide a channel indication method and apparatus.

According to a first aspect of the present disclosure, there is provided a channel indication method. The method includes that a base station on an unlicensed spectrum determines one or more first subbands that pass a channel access. Additionally, the method includes that the base station generates a channel indication signal to indicate the one or more first subbands that pass the channel access. Furthermore, the base station transmits the channel indication signal to a terminal to determine, based on the channel indication signal, the one or more first subbands that pass the channel access. The channel indication signal includes downlink control information (DCI), and at least one information field in the DCI indicates the one or more first subbands that pass the channel access.

According to a second aspect of the present disclosure, there is provided a channel indication method. The method includes that a terminal on an unlicensed spectrum receives a channel indication signal from a base station, wherein the channel indication signal indicates one or more first subbands that pass a channel access. Furthermore, the method includes that the terminal determines, based on the channel indication signal, the one or more first subbands that pass the channel access. The channel indication signal includes downlink control information (DCI), and at least one information field in the DCI indicates the one or more first subbands that pass the channel access.

According to a third aspect of the present disclosure, there is provided a device. The device includes one or more processors and a memory for storing instructions executable by the one or more processors.

The one or more processors are configured to: receive a channel indication signal from a base station, wherein the channel indication signal indicates one or more first subbands that pass a channel access; and determine, based on the channel indication signal, the one or more first subbands that pass the channel access. The channel indication signal includes downlink control information (DCI), and at least one information field in the DCI indicates the one or more first subbands that pass the channel access.

It should be understood that the above general description and the following detailed description are only exemplary and explanatory, and are not intended to limit the present disclosure.

BRIEF DESCRIPTION OF DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
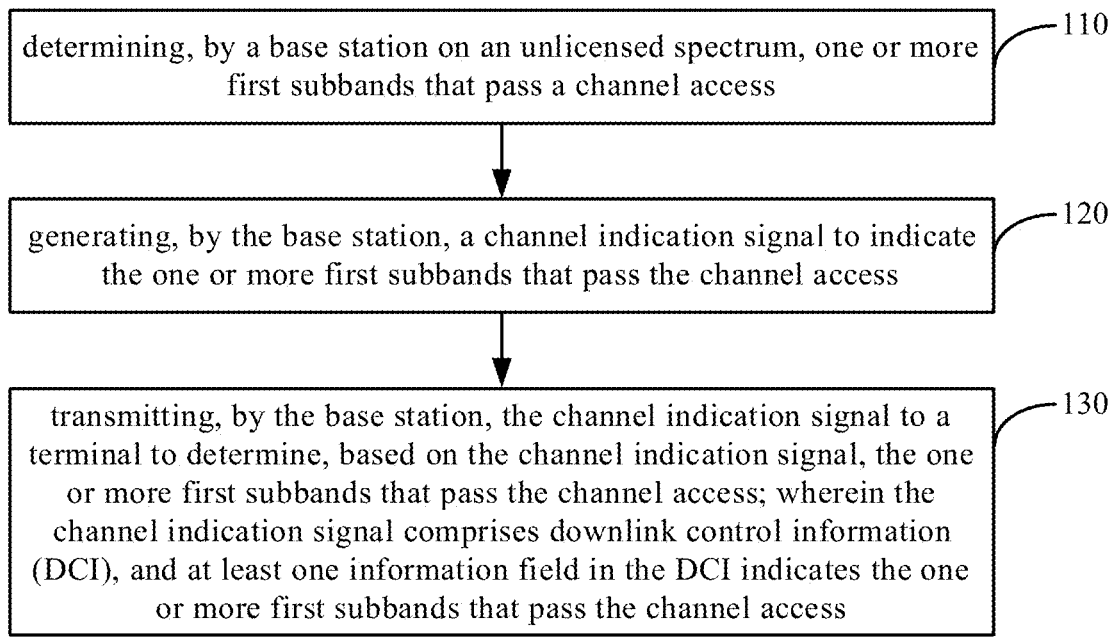
FIG. 1 is a flowchart of a channel indication method illustrated according to an example.

Exemplary embodiments will be described in detail here with the examples thereof expressed in the drawings. Where the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when", "upon", or "in response to determining".

Figure 2:
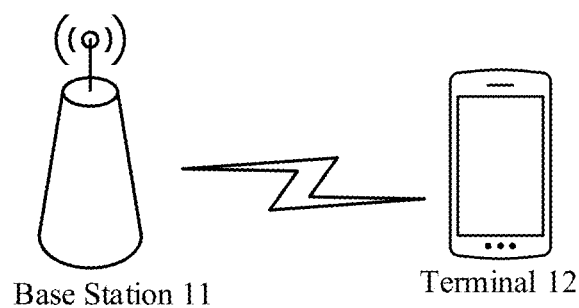
FIG. 2 is a scenario diagram of a channel indication method illustrated according to an example.

FIG. 1 is a flowchart of a channel indication method illustrated according to an example, and FIG. 2 is a scenario diagram of a channel indication method illustrated according to an example. The channel indication method can be performed by a base station working on an unlicensed spectrum. As illustrated in FIG. 1, the channel indication method includes the following steps 110-130.

At step 110, one or more first channel detection subbands that pass a channel detection are determined. The term "channel detection" may also be referred to as "channel access" through the present disclosure.

In one or more examples of the present disclosure, the base station may perform the channel detection on a plurality of channel detection subbands to obtain a channel detection result. The one or more first channel detection subbands that pass the channel detection may be included in the channel detection result. The first channel detection subband here refers to a channel detection subband that has passed the channel detection.

In addition, the one or more first channel detection subbands that pass the channel detection may be a plurality of bandwidth parts configured on one unlicensed carrier, a plurality of unlicensed carriers, or a plurality of bandwidth parts configured on a plurality of unlicensed carriers.

At step 120, a channel indication signal is generated. The channel indication signal indicates the one or more first channel detection subbands that pass the channel detection.

In one or more examples of the present disclosure, the channel indication signal indicates which channel detection subbands have passed the channel detection.

In an example, the channel indication signal in the step 120 may include a first downlink signal and first downlink control signaling, which is also known as downlink control information (DCI). The first downlink signal is configured for instructing a terminal to detect the downlink control signaling transmitted subsequently. The first downlink control signaling includes identification information for representing the one or more first channel detection subbands. The detailed realization of this example may refer to an example illustrated in FIG. 3.

In an example, the channel indication signal in the step 120 may include a second downlink signal, which is also known as downlink control information (DCI). A sequence value of the second downlink signal indicates the one or more first channel detection subbands that pass the channel detection. The detailed realization of this example may refer to an example illustrated in FIG. 4.

In an example, the channel indication signal in the step 120 may include a third downlink signal. One or more positions at which the third downlink signal is transmitted indicate the one or more first channel detection subbands that pass the channel detection. The detailed realization of this example may refer to an example illustrated in FIG. 5.

In an example, the channel indication signal in the step 120 may include second downlink control signaling. A designated information field of the second downlink control signaling includes first indication information for explicitly indicating the one or more first channel detection subbands, or a CRC scrambling sequence of the second downlink control signaling includes second indication information for implicitly indicating the one or more first channel detection subbands. The detailed realization of this example may refer to an example illustrated in FIG. 6.

At step 130, the channel indication signal is transmitted to the terminal, so that the terminal determines, based on the channel indication signal, the one or more first channel detection subbands that pass the channel detection.

In one or more examples of the present disclosure, the base station can inform the terminal which channel detection subbands have passed the channel detection through the channel indication signal, so that the terminal can perform a data transmission on these channel detection subbands that have passed the channel detection.

As illustrated in FIG. 2, a base station 11 and a terminal 12 are included in an exemplary scenario. After determining one or more first channel detection subbands that pass a channel detection, the base station 11 may generate a channel indication signal. The channel indication signal indicates the one or more first channel detection subbands that pass the channel detection, and is transmitted to the terminal 12. After receiving the channel indication signal from the base station 11, the terminal 12 can determine, based on the channel indication signal, the one or more first channel detection subbands that pass the channel detection, and perform a data transmission on the one or more first channel detection subbands.

In the present disclosure, the base station 11 may be a facility deployed in an access network to provide the terminal 12 with wireless communication functions. The base station 11 may cover various forms of a macro base station, a micro base station, a relay station, an access point and the like. In systems implemented with different wireless access technologies, the facility with base station functions may be named differently. For example, in a 5G NR system, it is called gNodeB or gNB. The name, "base station", may be changed with the development of communication technologies. In order to simplify the description, in the examples of the present disclosure, the above-mentioned facilities that provide the terminal 12 with the wireless communication functions is collectively referred to as base stations.

There are usually a plurality of terminals 12. In a cell controlled by one base station 11, there may distribute one or more terminals 12. The terminal 12 may cover various devices with the wireless communication functions, such as handheld devices, in-vehicle devices, wearable devices, computing devices or other processing devices connected to a wireless modem, and may cover various forms of User Equipment (UE), a mobile station (MS), a terminal device and the like. In order to simplify the description, in the examples of the present disclosure, the devices mentioned above are collectively referred to as terminals.

According to the above examples, after determining the one or more first channel detection subbands that pass the channel detection, the channel indication signal can be generated to indicate the one or more first channel detection subbands that pass the channel detection, and be transmitted to the terminal, so that based on the channel indication signal, the terminal can accurately determine the one or more first channel detection subbands that pass the channel detection, thereby reducing an energy consumption for the channel detection and improving a data transmission performance.

Figure 3:
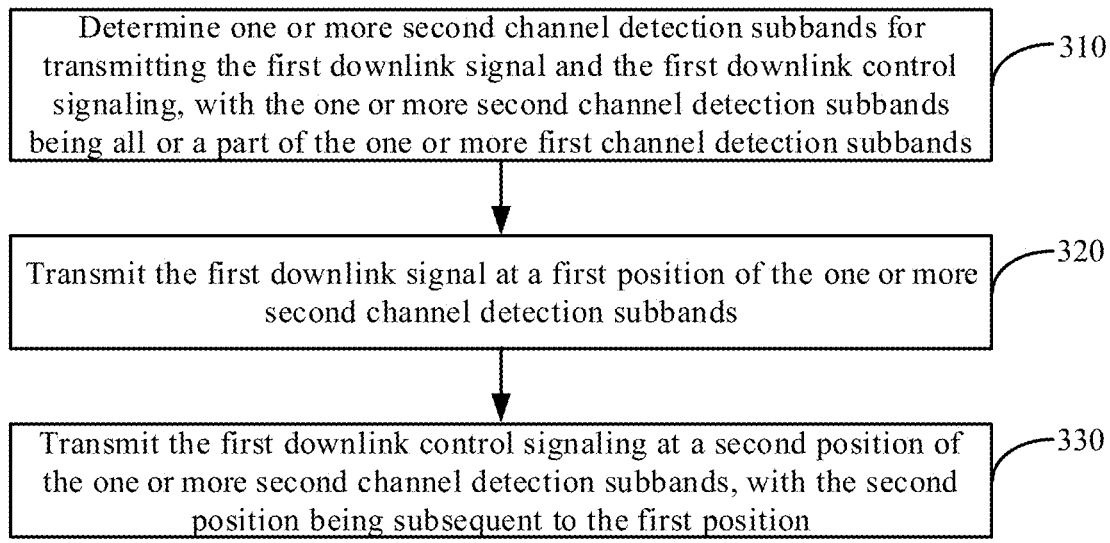
FIG. 3 is a flowchart of another channel indication method illustrated according to an example.

FIG. 3 is a flowchart of another channel indication method illustrated according to an example. The channel indication method can be performed by a base station working on an unlicensed spectrum. On the basis of the method illustrated in FIG. 1, the channel indication signal includes a first downlink signal and first downlink control signaling, the first downlink signal is configured for instructing the terminal to detect the downlink control signaling transmitted subsequently, and the first downlink control signaling includes identification information for representing the one or more first channel detection subbands. As illustrated in FIG. 3, when the step 130 is performed, the following steps 310-330 may be included.

At step 310, one or more second channel detection subbands for transmitting the first downlink signal and the first downlink control signaling are determined. The one or more second channel detection subbands are all or a part of the one or more first channel detection subbands.

In one or more examples of the present disclosure, the first downlink signal may be a Demodulation Reference Signal (DMRS), a Channel State Information Reference Signal (CSI-RS), or another type of downlink signal. The first downlink control signaling may be control signaling configured to carry common control information.

Figure 3A:
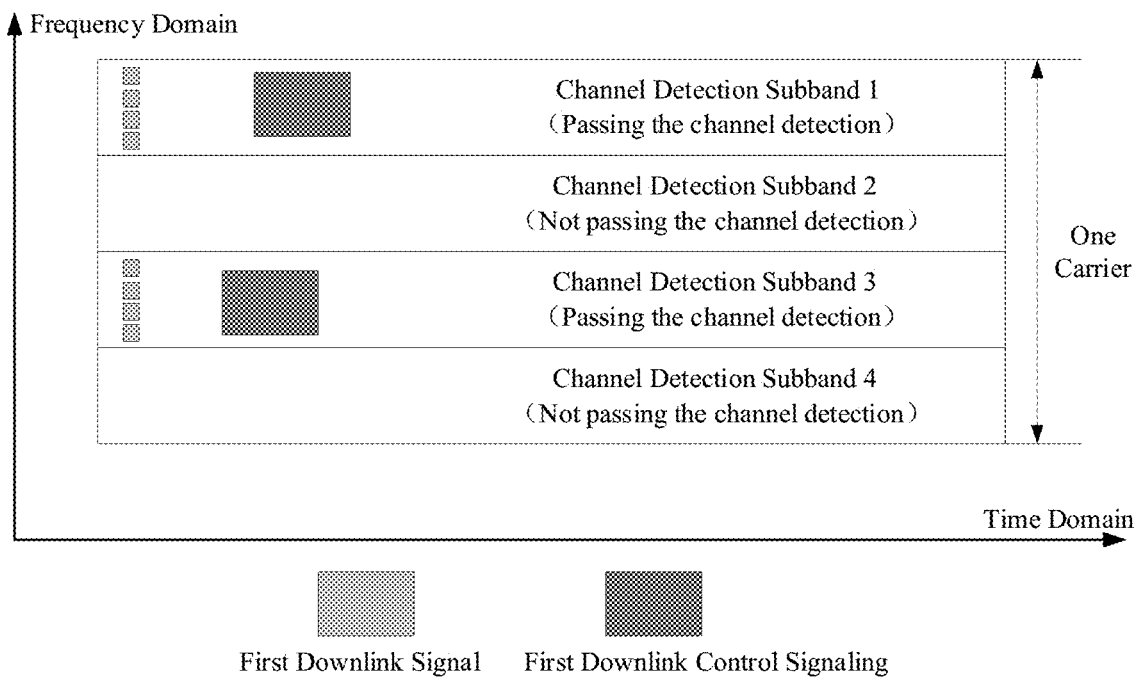
FIG. 3A is a schematic diagram of a channel-indicating way illustrated according to an example.

If the one or more second channel detection subbands are all of the one or more first channel detection subbands, it means that the first downlink signal and the first downlink control signaling are to be transmitted on every first channel detection subband. As illustrated in FIG. 3A, a channel detection subband 1 and a channel detection subband 3 are the first channel detection subbands that pass the channel detection, and the first downlink signal and the first downlink control signaling are transmitted on the channel detection subband 1 and the channel detection subband 3.

As an example, the first downlink control signaling transmitted on the channel detection subband 1 and the first downlink control signaling transmitted on the channel detection subband 3 include the same identification information: Channel Detection Subband 1 and Channel Detection Subband 3.

As another example, the identification information included in the first downlink control signaling transmitted on the channel detection subband 1 is Channel Detection Subband 1, and the identification information included in the first downlink control signaling transmitted on the channel detection subband 3 is Channel Detection Subband 3.

Figure 3B:
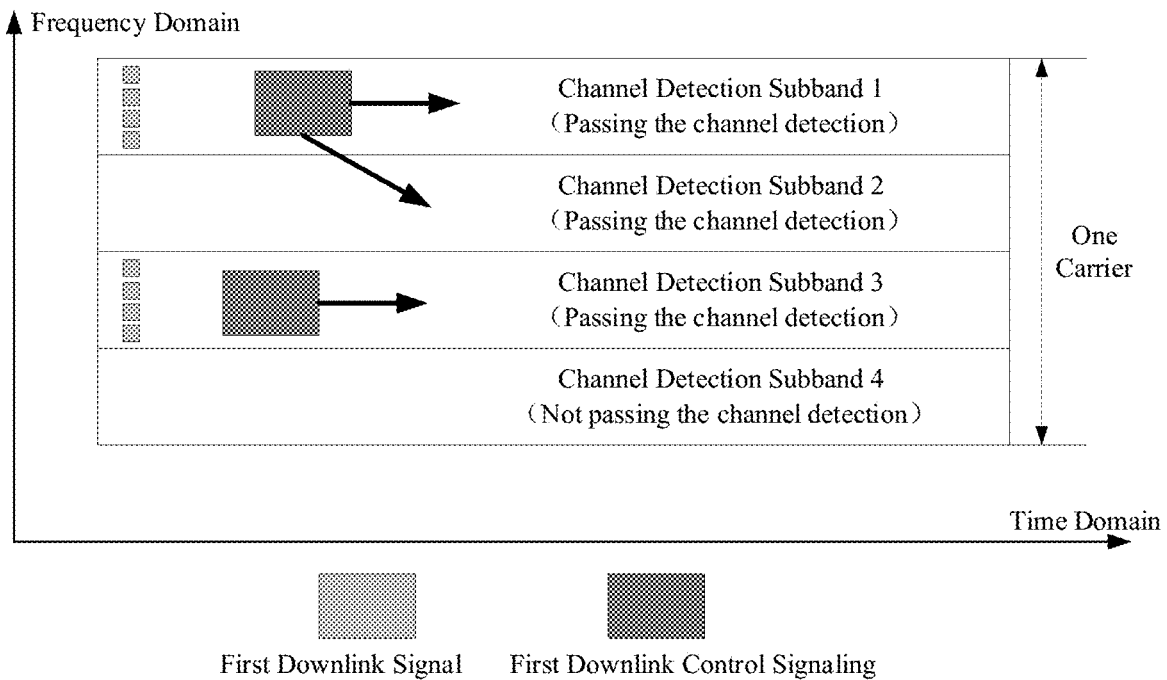
FIG. 3B is a schematic diagram of another channel-indicating way illustrated according to an example.

If the one or more second channel detection subbands are a part of the one or more first channel detection subbands, it means that the first downlink signal and the first downlink control signaling are to be transmitted on each of the part of subbands. As illustrated in FIG. 3B, a channel detection subband 1, a channel detection subband 2 and a channel detection subband 3 are the first channel detection subbands that pass the channel detection, and the first downlink signal and the first downlink control signaling are only transmitted on the channel detection subband 1 and the channel detection subband 3.

As an example, the first downlink control signaling transmitted on the channel detection subband 1 and the first downlink control signaling transmitted on the channel detection subband 3 include the same identification information: Channel Detection Subband 1, Channel Detection Subband 2, and Channel Detection Subband 3.

As another example, the identification information included in the first downlink control signaling transmitted on the channel detection subband 1 is Channel Detection Subband 1 and Channel Detection Subband 2, and the identification information included in the first downlink control signaling transmitted on the channel detection subband 3 is Channel Detection Subband 3.

At step 320, the first downlink signal is transmitted at a first position of the one or more second channel detection subbands.

At step 330, the first downlink control signaling is transmitted at a second position of the one or more second channel detection subbands. The second position is subsequent to the first position.

A time interval between the first position in the step 320 and the second position in the step 330 may be predefined or be informed by the base station in advance through signaling.

According to the above example, the first downlink signal and the first downlink control signaling can be transmitted respectively at the first position and the second position of each of the one or more first channel detection subbands, or respectively at the first position and the second position of each of the part of the one or more first channel detection subbands, thereby enriching a channel indication diversity and improving a channel indication reliability.

Figure 4:
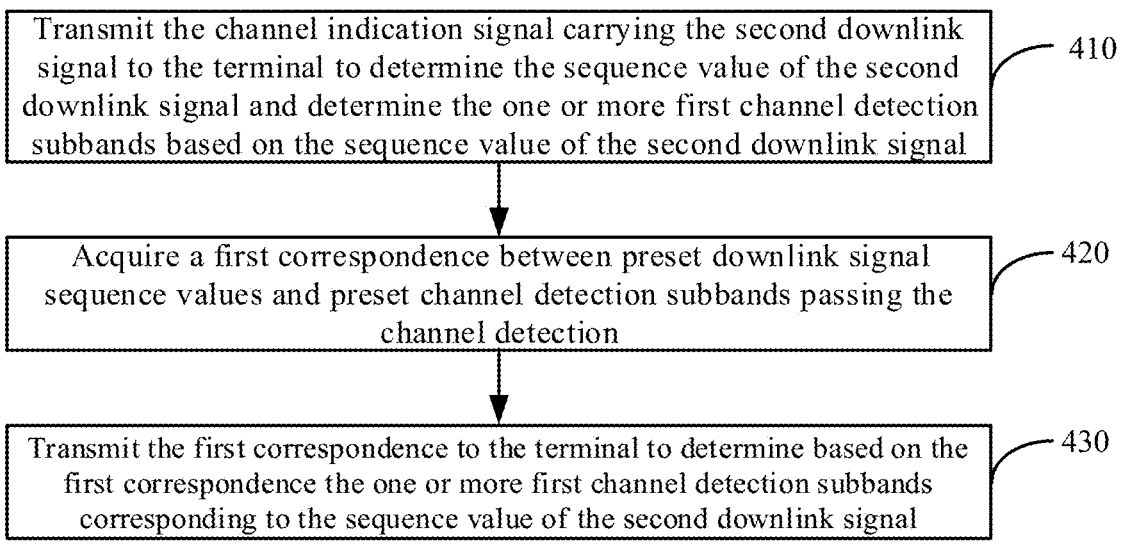
FIG. 4 is a flowchart of another channel indication method illustrated according to an example.

FIG. 4 is a flowchart of another channel indication method illustrated according to an example. The channel indication method can be performed by a base station working on an unlicensed spectrum. On the basis of the method illustrated in FIG. 1, the channel indication signal includes a second downlink signal, and a sequence value of the second downlink signal indicates the one or more first channel detection subbands that pass the channel detection. As illustrated in FIG. 4, when the step 130 is performed, the following step 410 may be included.

At step 410, the channel indication signal carrying the second downlink signal is transmitted to the terminal, so that the terminal determines the sequence value of the second downlink signal, and determines the one or more first channel detection subbands based on the sequence value of the second downlink signal.

In an example, as illustrated in FIG. 4, the channel indication method may further include the following steps 420-430.

At step 420, a first correspondence between preset downlink signal sequence values and preset channel detection subbands passing the channel detection is acquired.

Figures 4A, 5:
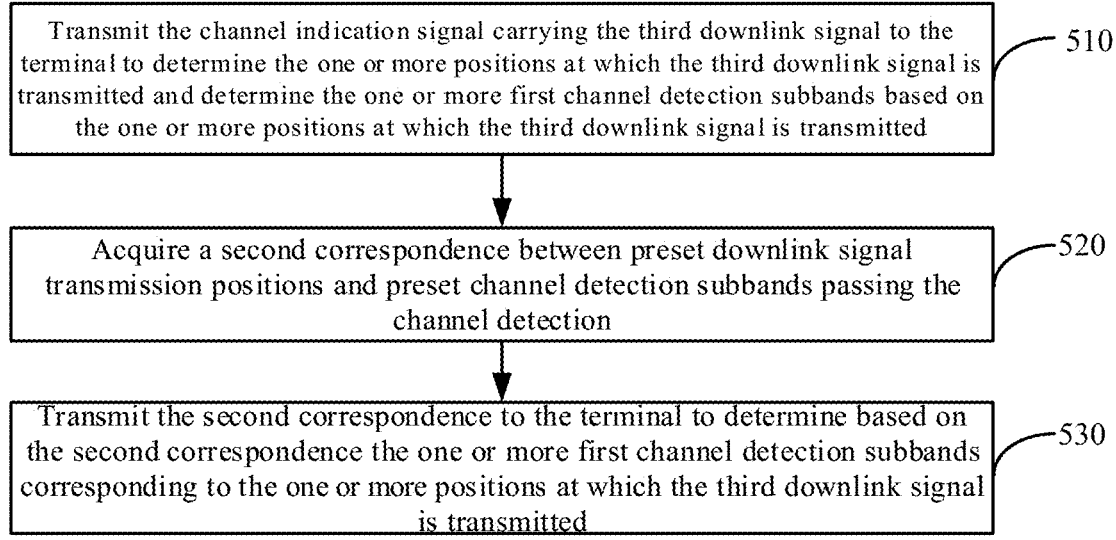
FIG. 4A is a schematic diagram of a correspondence between downlink signal sequence values and channel detection subbands passing a channel detection illustrated according to an example.
FIG. 5 is a flowchart of another channel indication method illustrated according to an example.

In one or more examples of the present disclosure, the first correspondence involves the preset downlink signal sequence values and the preset channel detection subbands passing the channel detection. A specific correspondence may be illustrated in FIG. 4A in detail. As illustrated in FIG. 4A, the first downlink signal may be a DMRS, and the preset downlink signal sequence values include a DMRS sequence 1, a DMRS sequence 2, a DMRS sequence 3, a DMRS sequence 4, a DMRS sequence 5, and so on. The DMRS sequence 1 corresponds to a channel detection subband 1, the DMRS sequence 2 corresponds to a channel detection subband 2, the DMRS sequence 3 corresponds to a channel detection subband 3, the DMRS sequence 4 corresponds to the channel detection subbands 1 and 2, the DMRS sequence 5 corresponds to the channel detection subbands 1, 2, 3 and 4, and so on.

At step 430, the first correspondence is transmitted to the terminal, so that the terminal determines, based on the first correspondence, the one or more first channel detection subbands corresponding to the sequence value of the second downlink signal.

In one or more examples of the present disclosure, there is no restriction on an order of the transmissions in the step 410 and the step 430. The transmission in the step 410 and the transmission in the step 430 may be performed at the same time, the transmission in the step 410 may be performed before that in the step 430, or the transmission in the step 410 may be performed after that in the step 430.

In addition, if the terminal may know the first correspondence in the steps 420-430 in advance instead of being informed by the base station, for example, if the first correspondence has been given in a protocol, the base station may not transmit the first correspondence to the terminal.

According to the above examples, the sequence value of the second downlink signal can be utilized to indicate the one or more first channel detection subbands that pass the channel detection, and the channel indication signal carrying the second downlink signal can be transmitted to the terminal, so that the terminal can determine the sequence value of the second downlink signal, and determine the one or more first channel detection subbands based on the sequence value of the second downlink signal, thereby saving a signaling overhead for the channel indication and improving a channel indication efficiency.

FIG. 5 is a flowchart of another channel indication method illustrated according to an example. The channel indication method can be performed by a base station working on an unlicensed spectrum. On the basis of the method illustrated in FIG. 1, the channel indication signal includes a third downlink signal, and one or more positions at which the third downlink signal is transmitted indicate the one or more first channel detection subbands that pass the channel detection. As illustrated in FIG. 5, when the step 130 is performed, the following step 510 may be included.

At step 510, the channel indication signal carrying the third downlink signal is transmitted to the terminal, so that the terminal determines the one or more positions at which the third downlink signal is transmitted, and determines the one or more first channel detection subbands based on the one or more positions at which the third downlink signal is transmitted.

In an example, as illustrated in FIG. 5, the channel indication method may further include the following steps 520-530.

At step 520, a second correspondence between preset downlink signal transmission positions and preset channel detection subbands passing the channel detection is acquired.

In one or more examples of the present disclosure, the second correspondence involves acquiring the preset downlink signal transmission positions and the preset channel detection subbands passing the channel detection. For example, the third downlink signal may be a DMRS. If the DMRS is detected at a frequency position x on a channel detection subband, it means that the channel detection subband 1 has passed the channel detection. If the DMRS is detected at a frequency position y on a channel detection subband, it means that the channel detection subbands 1 and 2 have passed the channel detection. Either x or y may correspond to one or more values. The correspondence between the DMRS transmission positions and the channel detection results is pre-defined or informed to the terminal through signaling by the base station.

At step 530, the second correspondence is transmitted to the terminal, so that the terminal determines, based on the second correspondence, the one or more first channel detection subbands corresponding to the one or more positions at which the third downlink signal is transmitted.

In one or more examples of the present disclosure, there is no restriction on an order of the transmissions in the step 510 and the step 530. The transmission in the step 510 and the transmission in the step 530 may be performed at the same time, the transmission in the step 510 may be performed before that in the step 530, or the transmission in the step 510 may be performed after that in the step 530.

In addition, if the terminal may know the second correspondence in the steps 520-530 in advance instead of being informed by the base station, for example, if the second correspondence has been given in a protocol, the base station may not transmit the second correspondence to the terminal.

According to the above examples, the one or more positions at which the third downlink signal is transmitted can be utilized to indicate the one or more first channel detection subbands that pass the channel detection, and the channel indication signal carrying the third downlink signal can be transmitted to the terminal, so that the terminal can determine the one or more positions at which the third downlink signal is transmitted, and determine the one or more first channel detection subbands based on the one or more positions at which the third downlink signal is transmitted, thereby saving a signaling overhead for the channel indication and extending channel indication forms.

Figure 6:
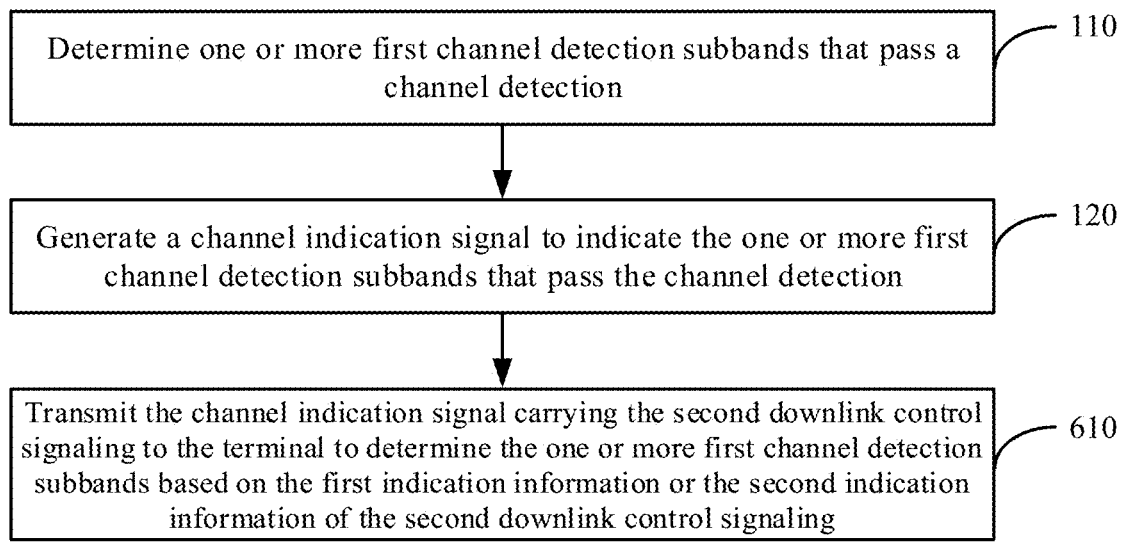
FIG. 6 is a flowchart of another channel indication method illustrated according to an example.

FIG. 6 is a flowchart of another channel indication method illustrated according to an example. The channel indication method can be performed by a base station working on an unlicensed spectrum. On the basis of the method illustrated in FIG. 1, the channel indication signal includes second downlink control signaling. A designated information field of the second downlink control signaling includes first indication information for explicitly indicating the one or more first channel detection subbands, or a CRC scrambling sequence of the second downlink control signaling includes second indication information for implicitly indicating the one or more first channel detection subbands. As illustrated in FIG. 6, when the step 130 is performed, the following step 610 may be included.

At step 610, the channel indication signal carrying the second downlink control signaling is transmitted to the terminal, so that the terminal determines the one or more first channel detection subbands based on the first indication information or the second indication information of the second downlink control signaling.

According to the above example, the second downlink control signaling can be utilized to explicitly or implicitly indicate the one or more first channel detection subbands that pass the channel detection, and the channel indication signal carrying the second downlink control signaling can be transmitted to the terminal, so that the terminal can determine the one or more first channel detection subbands based on the first indication information or the second indication information of the second downlink control signaling, thereby improving a channel indication accuracy.

Figure 7:
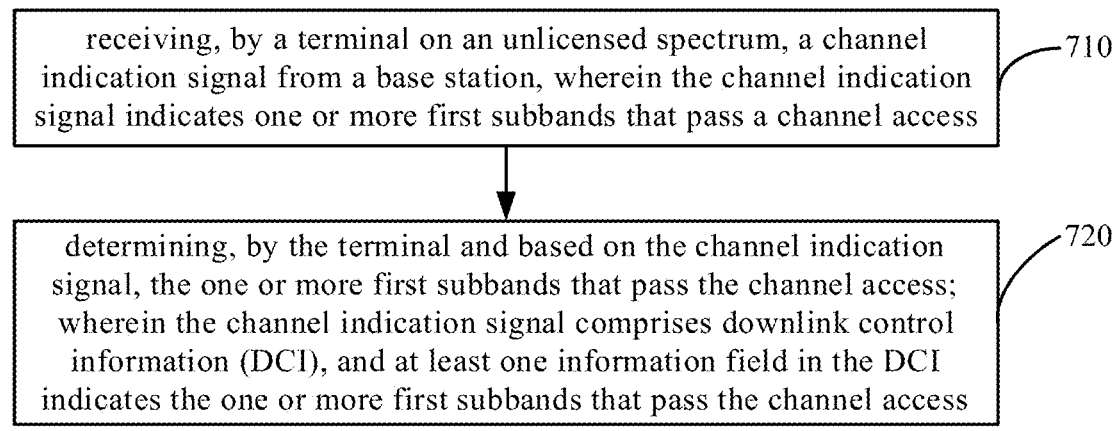
FIG. 7 is a flowchart of a channel indication method illustrated according to an example.

FIG. 7 is a flowchart of a channel indication method illustrated according to an example, and FIG. 2 is a scenario diagram of a channel indication method illustrated according to an example. The channel indication method can be performed by a terminal working on an unlicensed spectrum. As illustrated in FIG. 7, the channel indication method includes the following steps 710-720.

At step 710, a channel indication signal from a base station is received. The channel indication signal indicates one or more first channel detection subbands that pass a channel detection.

In one or more examples of the present disclosure, the base station can inform the terminal which channel detection subbands have passed the channel detection through the channel indication signal, so that the terminal can perform a data transmission on these channel detection subbands that pass the channel detection. The first channel detection subband here refers to a channel detection subband that has passed the channel detection.

In addition, the one or more first channel detection subbands that pass the channel detection may be a plurality of bandwidth parts configured on one unlicensed carrier, a plurality of unlicensed carriers, or a plurality of bandwidth parts configured on a plurality of unlicensed carriers.

At step 720, the one or more first channel detection subbands that pass the channel detection are determined based on the channel indication signal.

In one or more examples of the present disclosure, in view of different contents included in the channel indication signal, the terminal may determine the one or more first channel detection subbands that pass the channel detection in a corresponding manner.

In an example, the channel indication signal in the step 710 may include a first downlink signal and first downlink control signaling. The first downlink signal is configured for instructing the terminal to detect the downlink control signaling transmitted subsequently. The first downlink control signaling includes identification information for representing the one or more first channel detection subbands. Correspondingly, when the step 710 is performed, it may include:
  (1-1) performing a receipt action for the first downlink signal; and
  (1-2) proceeding to receive the first downlink control signaling if the first downlink signal is received.

In this way, since it is unknown for the terminal which first channel detection subband is used by the base station to transmit the identification information, the terminal receives the first downlink signal on every channel detection subband. Only after the first downlink signal is received on a channel detection subband, the terminal determines that the base station will transmit the identification information on the first channel detection subband, and thus continues to receive subsequent first downlink control signaling.

Correspondingly, when the step 720 is performed, it may include:
  (1-3) determining the one or more first channel detection subbands based on the identification information included in the first downlink control signaling.

In an example, the channel indication signal in the step 710 may include a second downlink signal. A sequence value of the second downlink signal indicates the one or more first channel detection subbands that pass the channel detection. Correspondingly, when the step 720 is performed, it may include:
  (2-1) determining the sequence value of the second downlink signal; and
  (2-2) determining the one or more first channel detection subbands based on the sequence value of the second downlink signal.

In an example, when the step (2-2) is performed, it may include:
  (3-1) acquiring a first correspondence between preset downlink signal sequence values and preset channel detection subbands passing the channel detection; and
  (3-2) determining, based on the first correspondence, the one or more first channel detection subbands corresponding to the sequence value of the second downlink signal.

The approach for acquiring the first correspondence in above step (3-1) may include: receiving a notice from the base station; or learning in advance in the terminal, for example, when the first correspondence is given in a protocol.

In an example, the channel indication signal in the step 710 may include a third downlink signal. One or more positions at which the third downlink signal is transmitted indicate the one or more first channel detection subbands that pass the channel detection. Correspondingly, when the step 720 is performed, it may include:
  (4-1) determining the one or more positions at which the third downlink signal is transmitted; and
  (4-2) determining the one or more first channel detection subbands based on the one or more positions at which the third downlink signal is transmitted.

In an example, when the step (4-2) is performed, it may include:
  (5-1) acquiring a second correspondence between preset downlink signal transmission positions and preset channel detection subbands passing the channel detection; and
  (5-2) determining, based on the second correspondence, the one or more first channel detection subbands corresponding to the one or more positions at which the second downlink signal is transmitted.

The approach for acquiring the second correspondence in above step (5-1) may include: receiving a notice from the base station; or learning in advance in the terminal, for example, the second correspondence given in a protocol.

In an example, the channel indication signal in the step 710 may include a second downlink control signaling. A designated information field of the second downlink control signaling includes first indication information for explicitly indicating the one or more first channel detection subbands, or a CRC scrambling sequence of the second downlink control signaling includes second indication information for implicitly indicating the one or more first channel detection subbands. Correspondingly, when the step 720 is performed, it may include:

(6-1) determining the one or more first channel detection subbands based on the first indication information or the second indication information. The first indication information is configured for explicitly indicating the one or more first channel detection subbands, and the second indication information is configured for implicitly indicating the one or more first channel detection subbands.

According to the above examples, after the channel indication signal, which is transmitted by the base station and indicates the one or more first channel detection subbands that pass the channel detection, is received, the one or more first channel detection subbands that pass the channel detection can be accurately determined based on the channel indication signal, thereby reducing an energy consumption for the channel detection and improving a data transmission performance. In particular, it can adopt corresponding determination schemes according to different contents included in the channel indication signal, thereby enriching a channel indication diversity and improving a channel indication reliability and a channel indication accuracy.

Corresponding to the foregoing channel indication method examples, the present disclosure also provides channel indication apparatus examples.

Figure 8:
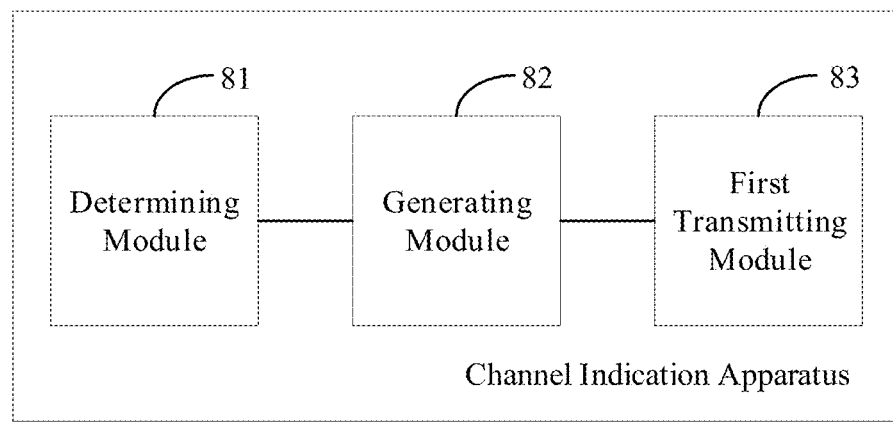
FIG. 8 is a block diagram of a channel indication apparatus illustrated according to an example.

FIG. 8 is a block diagram of a channel indication apparatus illustrated according to an example. The apparatus is configured in a base station working on an unlicensed spectrum and is configured to perform the channel indication method illustrated in FIG. 1. As illustrated in FIG. 8, the channel indication apparatus may include:

a determining module 81 that is configured to determine one or more first channel detection subbands that pass a channel detection;

a generating module 82 that is configured to generate a channel indication signal to indicate the one or more first channel detection subbands that pass the channel detection; and a first transmitting module 83 that is configured to transmit the channel indication signal to a terminal, so that the terminal determines, based on the channel indication signal, the one or more first channel detection subbands that pass the channel detection.

According to the above example, after determining the one or more first channel detection subbands that pass the channel detection, the channel indication signal can be generated to indicate the one or more first channel detection subbands that pass the channel detection, and can be transmitted to the terminal, so that based on the channel indication signal, the terminal can accurately determine the one or more first channel detection subbands that pass the channel detection, thereby reducing an energy consumption for the channel detection and improving a data transmission performance.

Figure 9:
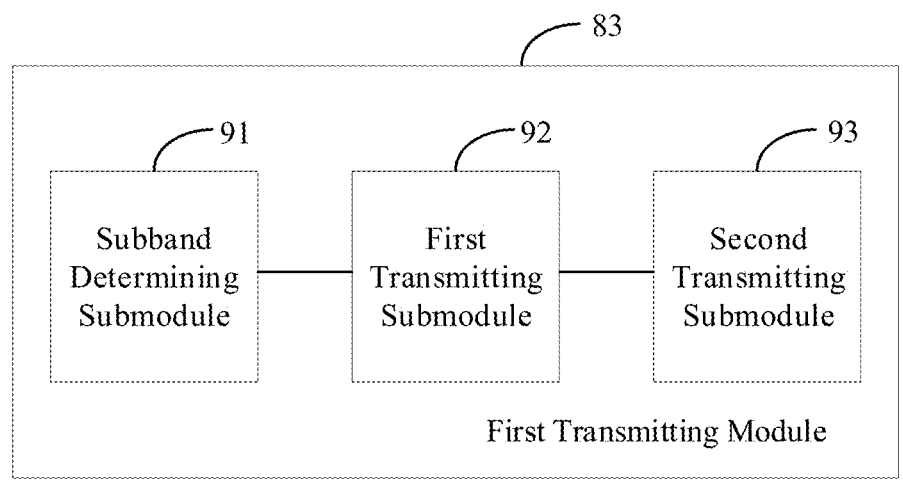
FIG. 9 is a block diagram of another channel indication apparatus illustrated according to an example.

In an example, on the basis of the apparatus illustrated in FIG. 8, the channel indication signal includes a first downlink signal and first downlink control signaling. The first downlink signal is configured for instructing the terminal to detect the downlink control signaling transmitted subsequently. The first downlink control signaling includes identification information for representing the one or more first channel detection subbands. In an example, as illustrated in FIG. 9, the first transmitting module 83 may include:

a subband determining submodule 91 that is configured to determine one or more second channel detection subbands for transmitting the first downlink signal and the first downlink control signaling, where the one or more second channel detection subbands are all or a part of the one or more first channel detection subbands;

a first transmitting submodule 92 that is configured to transmit the first downlink signal at a first position of the one or more second channel detection subbands; and a second transmitting submodule 93 that is configured to transmit the first downlink control signaling at a second position of the one or more second channel detection subbands, where the second position is subsequent to the first position.

According to the above example, the first downlink signal and the first downlink control signaling can be transmitted respectively at the first position and the second position of each of the one or more first channel detection subbands, or respectively at the first position and the second position of each of a part of the one or more first channel detection subbands, thereby enriching a channel indication diversity and improving a channel indication reliability.

Figure 10:
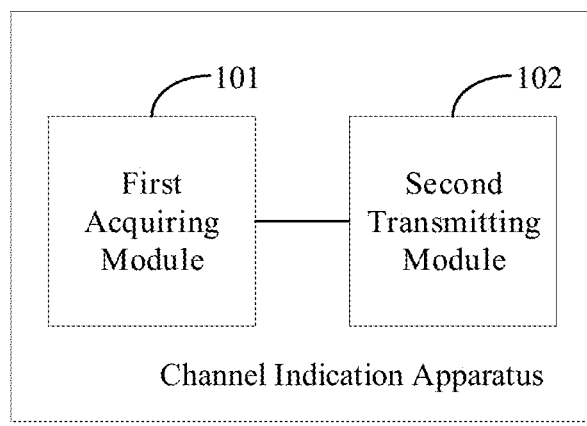
FIG. 10 is a block diagram of another channel indication apparatus illustrated according to an example.

In an example, on the basis of the apparatus illustrated in FIG. 8, the channel indication signal includes a second downlink signal. A sequence value of the second downlink signal indicates the one or more first channel detection subbands that pass the channel detection. In an example, as illustrated in FIG. 10, the apparatus further includes:

a first acquiring module 101 that is configured to acquire a first correspondence between preset downlink signal sequence values and preset channel detection subbands passing the channel detection; and a second transmitting module 102 that is configured to transmit the first correspondence to the terminal, so that the terminal determines, based on the first correspondence, the one or more first channel detection subbands corresponding to the sequence value of the second downlink signal.

According to the above example, the sequence value of the second downlink signal can be utilized to indicate the one or more first channel detection subbands that pass the channel detection, and the channel indication signal carrying the second downlink signal can be transmitted to the terminal, so that the terminal can determine the sequence value of the second downlink signal, and determine the one or more first channel detection subbands based on the sequence value of the second downlink signal, thereby saving a signaling overhead for the channel indication and improving a channel indication efficiency.

Figure 11:
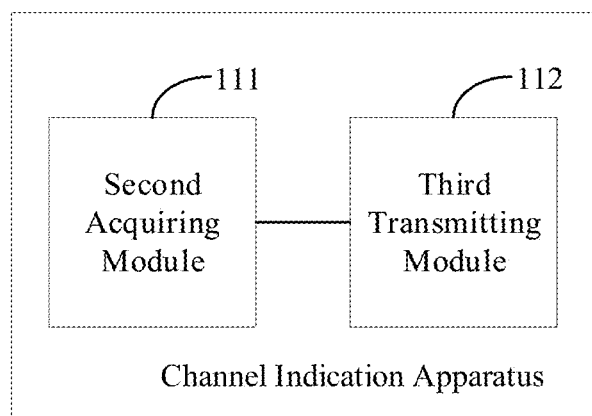
FIG. 11 is a block diagram of another channel indication apparatus illustrated according to an example.

In an example, on the basis of the apparatus illustrated in FIG. 8, the channel indication signal includes a third downlink signal. One or more positions at which the third downlink signal is transmitted indicate the one or more first channel detection subbands that pass the channel detection. In an example, as illustrated in FIG. 11, the apparatus further includes:

a second acquiring module 111 that is configured to acquire a second correspondence between preset downlink signal transmission positions and preset channel detection subbands passing the channel detection; and a third transmitting module 112 that is configured to transmit the second correspondence to the terminal to determine, based on the second correspondence, the one or more first channel detection subbands corresponding to the one or more positions at which the third downlink signal is transmitted.

According to the above example, the one or more positions at which the third downlink signal is transmitted can be utilized to indicate the one or more first channel detection subbands that pass the channel detection, and the channel indication signal carrying the third downlink signal can be transmitted to the terminal, so that the terminal can determine the one or more positions at which the third downlink signal is transmitted, and determine the one or more first channel detection subbands based on the one or more positions at which the third downlink signal is transmitted, thereby saving a signaling overhead for the channel indication and extending channel indication forms.

In an example, on the basis of the apparatus illustrated in FIG. 8, the channel indication signal includes second downlink control signaling. A designated information field of the second downlink control signaling includes first indication information for explicitly indicating the one or more first channel detection subbands, or a CRC scrambling sequence of the second downlink control signaling includes second indication information for implicitly indicating the one or more first channel detection subbands.

According to the above example, the second downlink control signaling can be utilized to explicitly or implicitly indicate the one or more first channel detection subbands that pass the channel detection, and the channel indication signal carrying the second downlink control signaling can be transmitted to the terminal, so that the terminal can determine the one or more first channel detection subbands based on the first indication information or the second indication information of the second downlink control signaling, thereby improving a channel indication accuracy.

Figure 12:
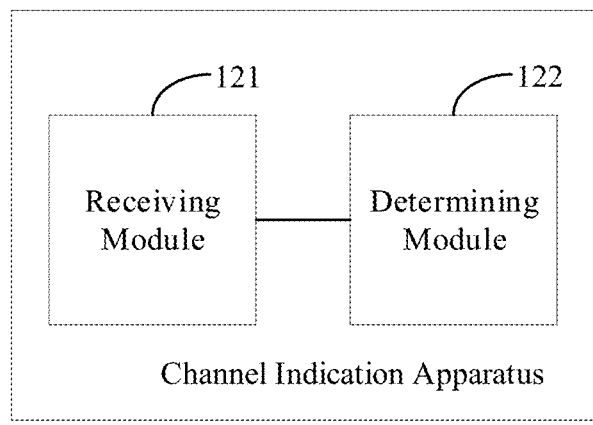
FIG. 12 is a block diagram of a channel indication apparatus illustrated according to an example.

FIG. 12 is a block diagram of a channel indication apparatus illustrated according to an example. The apparatus is configured in a terminal working on an unlicensed spectrum and is configured to perform the channel indication method illustrated in FIG. 7. As illustrated in FIG. 12, the channel indication apparatus may include:
- a receiving module 121 that is configured to receive a channel indication signal from a base station, where the channel indication signal indicates one or more first channel detection subbands that pass a channel detection; and
- a determining module 122 that is configured to determine, based on the channel indication signal, the one or more first channel detection subbands that pass the channel detection.

Figure 13:
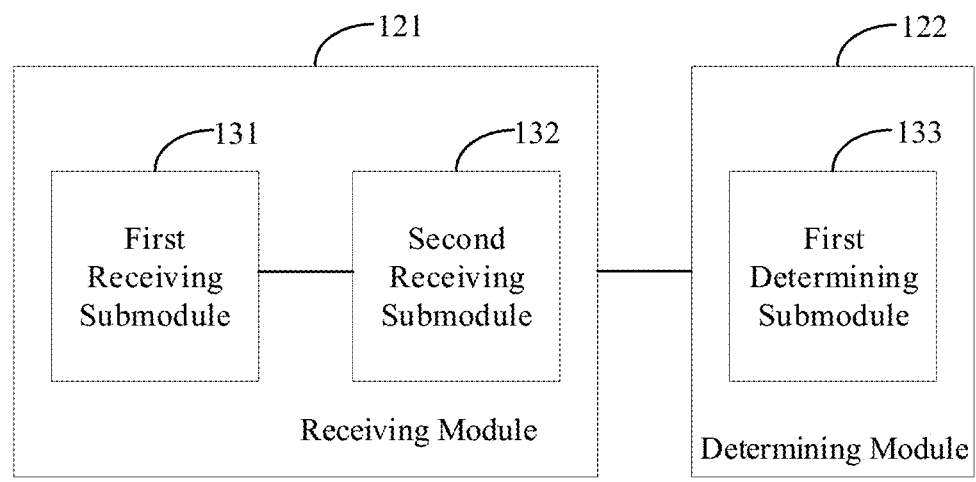
FIG. 13 is a block diagram of another channel indication apparatus illustrated according to an example.

In an example, on the basis of the apparatus illustrated in FIG. 12, the channel indication signal includes a first downlink signal and first downlink control signaling. The first downlink signal is configured for instructing the terminal to detect the downlink control signaling transmitted subsequently. The first downlink control signaling includes identification information for representing the one or more first channel detection subbands. In an example, as illustrated in FIG. 13, the receiving module 121 may include:
- a first receiving submodule 131 that is configured to perform a receipt action for the first downlink signal; and
- a second receiving submodule 132 that is configured to proceed to receive the first downlink control signaling if the first downlink signal is received.

The determining module 122 may include:
- a first determining submodule 133 that is configured to determine the one or more first channel detection subbands based on the identification information included in the first downlink control signaling.

Figure 14:
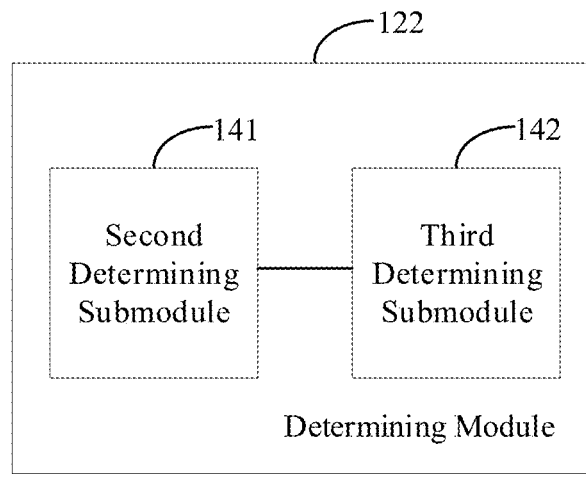
FIG. 14 is a block diagram of another channel indication apparatus illustrated according to an example.

In an example as illustrated in FIG. 14, on the basis of the apparatus illustrated in FIG. 12, the channel indication signal includes a second downlink signal. A sequence value of the second downlink signal indicates the one or more first channel detection subbands that pass the channel detection. The determining module 122 may include:
- a second determining submodule 141 that is configured to determine the sequence value of the second downlink signal; and
- a third determining submodule 142 that is configured to determine the one or more first channel detection subbands based on the sequence value of the second downlink signal.

Figure 15:
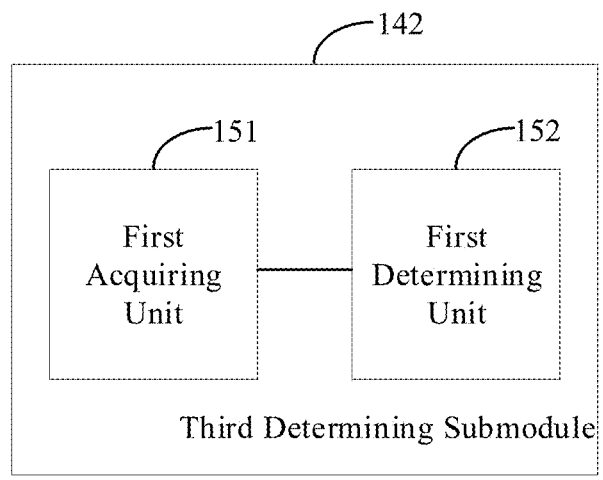
FIG. 15 is a block diagram of another channel indication apparatus illustrated according to an example.

In an example as illustrated in FIG. 15, on the basis of the apparatus illustrated in FIG. 14, the third determining submodule 142 may include:
- a first acquiring unit 151 that is configured to acquire a first correspondence between preset downlink signal sequence values and preset channel detection subbands passing the channel detection; and
- a first determining unit 152 that is configured to determine, based on the first correspondence, the one or more first channel detection subbands corresponding to the sequence value of the second downlink signal.

Figure 16:
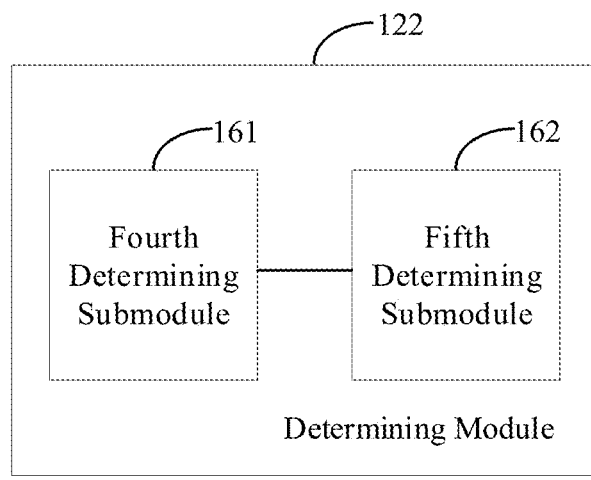
FIG. 16 is a block diagram of another channel indication apparatus illustrated according to an example.

In an example as illustrated in FIG. 16, on the basis of the apparatus illustrated in FIG. 12, the channel indication signal includes a third downlink signal. One or more positions at which the third downlink signal is transmitted indicate the one or more first channel detection subbands that pass the channel detection. The determining module 122 may include:
- a fourth determining submodule 161 that is configured to determine the one or more positions at which the third downlink signal is transmitted; and
- a fifth determining submodule 162 that is configured to determine the one or more first channel detection subbands based on the one or more positions at which the third downlink signal is transmitted.

Figure 17:
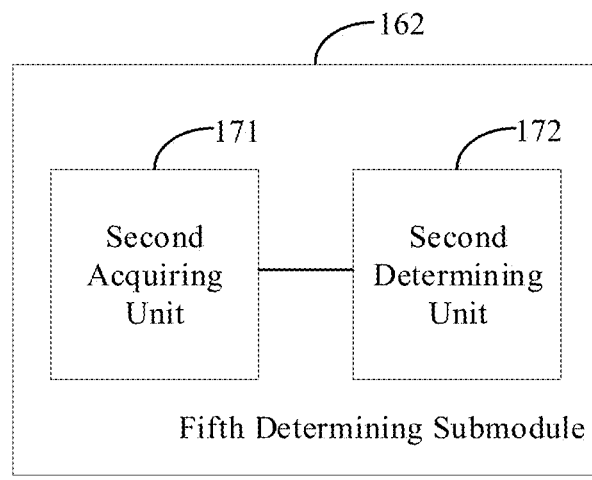
FIG. 17 is a block diagram of another channel indication apparatus illustrated according to an example.

In an example as illustrated in FIG. 17, on the basis of the apparatus illustrated in FIG. 16, the fifth determining submodule 162 may include:
- a second acquiring unit 171 that is configured to acquire a second correspondence between preset downlink signal transmission positions and preset channel detection subbands passing the channel detection; and
- a second determining unit 172 that is configured to determine, based on the second correspondence, the one or more first channel detection subbands corresponding to the one or more positions at which the third downlink signal is transmitted.

Figure 18:
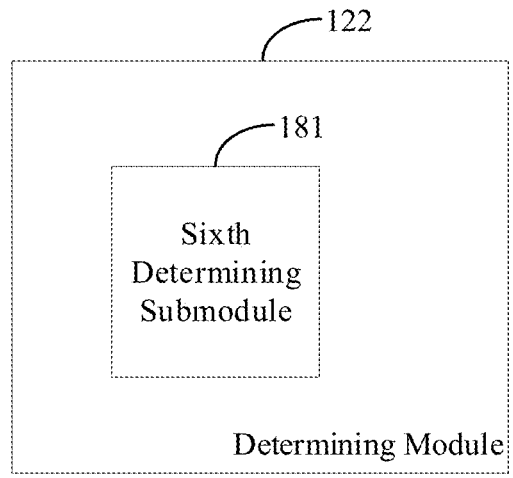
FIG. 18 is a block diagram of another channel indication apparatus illustrated according to an example.

In an example as illustrated in FIG. 18, on the basis of the apparatus illustrated in FIG. 12, the channel indication signal includes second downlink control signaling. A designated information field of the second downlink control signaling includes first indication information for explicitly indicating the one or more first channel detection subbands, or a CRC scrambling sequence of the second downlink control signaling includes second indication information for implicitly indicating the one or more first channel detection subbands. The determining module 122 may include:
- a sixth determining submodule 181 that is configured to determine the one or more first channel detection subbands based on the first indication information or the second indication information.

According to the above example, after the channel indication signal, which is transmitted by the base station and indicates the one or more first channel detection subbands that pass the channel detection, is received, the one or more first channel detection subbands that pass the channel detection can be accurately determined based on the channel indication signal, thereby reducing an energy consumption for the channel detection and improving a data transmission performance. In particular, it can adopt corresponding determination schemes according to different contents included in the channel indication signal, thereby enriching a channel indication diversity and improving a channel indication reliability and a channel indication accuracy.

Since the apparatus examples essentially correspond to the method examples, reference may be made to the description of related parts of the method examples. The apparatus examples described above are merely illustrative, where the units described as separate components may or may not be physically separated, and the components displayed as units may or may not be physical units, that is, may be located in one place or distributed to multiple units in a network. Some or all of the modules may be selected according to actual needs to achieve the objectives of the present disclosure. It can be understood and implemented by those of ordinary skill in the art without any creative effort.

The present disclosure also provides a non-transitory computer-readable storage medium having a computer program stored thereon, and the computer program is configured to perform the channel indication method described in any one of FIGS. 1-6.

The present disclosure also provides a non-transitory computer-readable storage medium having a computer program stored thereon, and the computer program is configured to perform the channel indication methods described in FIG. 7.

The present disclosure also provides a channel indication apparatus, configured in a base station working on an unlicensed spectrum, and the apparatus includes:
  one or more processors and a memory for storing instructions executable by the one or more processors.
  The one or more processors are configured to:
  determine one or more first channel detection subbands that pass a channel detection;
  generate a channel indication signal to indicate the one or more first channel detection subbands that pass the channel detection; and
  transmit the channel indication signal to a terminal to determine, based on the channel indication signal, the one or more first channel detection subbands that pass the channel detection.

Figure 19:
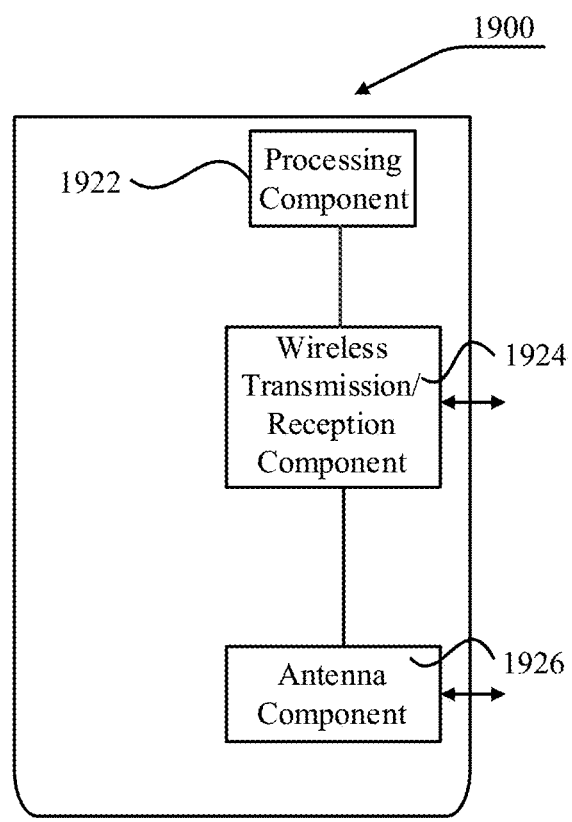
FIG. 19 is a structure schematic diagram of a channel indication apparatus illustrated according to an example.

As illustrated in FIG. 19, it is a structure schematic diagram of a channel indication apparatus illustrated according to an example. The apparatus 1900 may be provided as a base station. Referring to FIG. 19, the apparatus 1900 includes a processing component 1922, a wireless transmission/reception component 1924, an antenna component 1926, and a signal processing part peculiar to the wireless interface. The processing component 1922 may further include one or more processors.

One of the processors of the processing component 1922 may be configured to perform any one of the above channel indication methods illustrated in FIGS. 1-6.

The present disclosure also provides a channel indication apparatus, configured in a terminal working on an unlicensed spectrum, and the apparatus includes:
  one or more processors and a memory for storing instructions executable by the one or more processors.
  The one or more processors are configured to:
  receive a channel indication signal from a base station, where the channel indication signal indicates one or more first channel detection subbands that pass a channel detection; and
  determine, based on the channel indication signal, the one or more first channel detection subbands that pass the channel detection.

Figure 20:
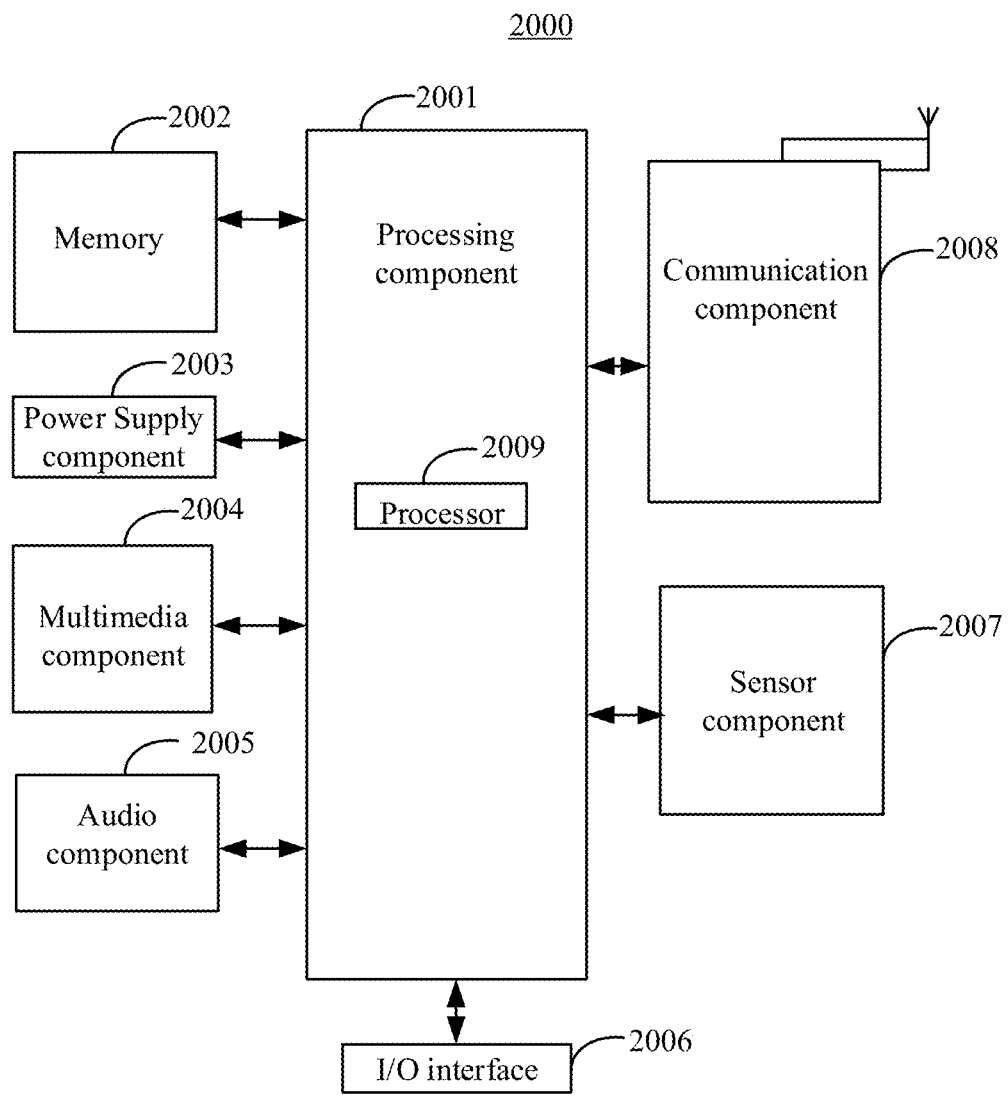
FIG. 20 is a structure schematic diagram of a channel indication apparatus illustrated according to an example.

FIG. 20 is a structure schematic diagram of a channel indication apparatus illustrated according to an example. As illustrated in FIG. 20, the channel indication apparatus 2000 according to an example may be a terminal, such as a computer, a mobile phone, a digital broadcasting terminal, a messaging device, a game console, a tablet device, a medical device, fitness equipment, and a personal digital assistant.

Referring to FIG. 20, the apparatus 2000 may include one or more of the following components: a processing component 2001, a memory 2002, a power supply component 2003, a multimedia component 2004, an audio component 2005, an input/output (I/O) interface 2006, a sensor component 2007, and a communication component 2008.

The processing component 2001 generally controls the overall operations of the apparatus 2000, such as operations associated with display, phone calls, data communications, camera operations, and recording operations. The processing component 2001 may include one or more processors 2009 to execute instructions to complete all or part of the steps of the above methods illustrated in FIG. 7. In addition, the processing component 2001 may include one or more modules to facilitate interaction between the processing component 2001 and other components. For example, the processing component 2001 may include a multimedia module to facilitate the interaction between the multimedia component 2004 and the processing component 2001.

The memory 2002 is configured to store various types of data to support the operation of the apparatus 2000. Examples of such data include instructions for any application or method operated on the apparatus 2000, contact data, phonebook data, messages, pictures, videos, and the like. The memory 2002 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk.

The power supply component 2003 provides power to various components of the apparatus 2000. The power supply component 2003 may include a power supply management system, one or more power supplies, and other components associated with generating, managing, and distributing power for the apparatus 2000.

The multimedia component 2004 includes a screen providing an output interface between the apparatus 2000 and a user. In some examples, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some examples, the multimedia component 2004 includes a front camera and/or a rear camera. The front camera and/or rear camera may receive external multimedia data when the apparatus 2000 is in an operating mode, such as a photographing mode or a video mode. Each front camera and rear camera may be a fixed optical lens system or have focal length and optical zooming capability.

The audio component 2005 is configured to output and/or input an audio signal. For example, the audio component 2005 includes a microphone (MIC) that is configured to receive an external audio signal when the apparatus 2000 is in an operating mode, such as a call mode, a recording mode, and a voice recognition mode. The received audio signal may be further stored in the memory 2002 or sent via the communication component 2008. In some examples, the audio component 2005 also includes a speaker for outputting an audio signal.

The I/O interface 2006 provides an interface between the processing component 2001 and a peripheral interface module. The above peripheral interface module may be a keyboard, a click wheel, buttons, or the like. These buttons may include but not limited to, a home button, a volume button, a start button and a lock button.

The sensor component 2007 includes one or more sensors to provide the apparatus 2000 with status assessments in various aspects. For example, the sensor component 2007 may detect an open/closed state of the apparatus 2000 and a relative positioning of components such as the display and keypad of the apparatus 2000, and the sensor component 2007 may also detect a change in position of the apparatus 2000 or a component of the apparatus 2000, the presence or absence of user contact with the apparatus 2000, orientation or acceleration/deceleration of the apparatus 2000, and temperature change of the apparatus 2000. The sensor component 2007 may include a proximity sensor configured to detect the presence of a nearby object without any physical contact. The sensor component 2007 may further include an optical sensor, such as a Complementary Metal-Oxide-Semiconductor (CMOS) or Charged Coupled Device (CCD) image sensor which is used in imaging applications. In some examples, the sensor component 2007 may also include an acceleration sensor, a gyro sensor, a magnetic sensor, a pressure sensor, or a temperature sensor.

The communication component 2008 is configured to facilitate wired or wireless communication between the apparatus 2000 and other devices. The apparatus 2000 may access a wireless network based on a communication standard, such as Wi-Fi, 2G, 3G, or a combination thereof. In an example, the communication component 2008 receives broadcast signals or broadcast related information from an external broadcast management system via a broadcast channel. In an example, the communication component 2008 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Blue Tooth (BT) technology and other technologies.

In an example, the apparatus 2000 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the above methods.

In some examples, there is also provided a non-transitory computer-readable storage medium including instructions, such as the memory 2002 including instructions executable by the processor 2009 of the apparatus 2000 to implement the above methods. For example, the non-transitory computer-readable storage medium may be a read-only memory (ROM), a random access memory (RAM), a CD-ROM, a magnetic tape, a floppy disk, an optical data storage device, and the like.

When instructions in the storage medium are executed by the processor, the apparatus 2000 can execute any one of the channel indication methods described above.

The technical solutions provided according to the examples of the present disclosure may achieve the following beneficial effects.

After determining one or more first subbands that pass a channel access, a base station in the present disclosure may generate a channel indication signal to indicate the one or more first subbands that pass the channel access, and transmit the channel indication signal to a terminal, so that based on the channel indication signal, the terminal can accurately determine the one or more first subbands that pass the channel access, thereby reducing an energy consumption for the channel access and improving a data transmission performance.

After receiving a channel indication signal that is transmitted by a base station and indicates one or more first subbands that pass a channel access, based on the channel indication signal, a terminal in the present disclosure can accurately determine the one or more first subbands that pass the channel access, thereby reducing an energy consumption for the channel detection and improving a data transmission performance.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above described accurate structures illustrated in the drawings, and various modifications and changes can be made to the present disclosure without departing from the scope thereof. The scope of the present disclosure is to be limited only by the appended claims.

The invention claimed is:

1. A channel indication method, comprising:
   determining, by a base station on an unlicensed spectrum, one or more first subbands that pass a channel access;
   generating, by the base station, a channel indication signal to indicate the one or more first subbands that pass the channel access; and
   transmitting, by the base station, the channel indication signal to a terminal to determine, based on the channel indication signal, the one or more first subbands that pass the channel access;
   wherein the channel indication signal comprises downlink control information (DCI), and at least one information field in the DCI indicates the one or more first subbands that pass the channel access.

2. The method according to claim 1, wherein a designated information field of the DCI comprises first indication information for explicitly indicating the one or more first subbands.

3. The method according to claim 1, wherein the DCI comprises identification information for representing the one or more first subbands.

4. The method according to claim 1, further comprising:
acquiring a correspondence between one or more positions at which the DCI is transmitted and the one or more first subbands; and
transmitting the correspondence to the terminal to determine, based on the correspondence, the one or more first subbands.

5. A channel indication method, comprising:
receiving, by a terminal on an unlicensed spectrum, a channel indication signal from a base station, wherein the channel indication signal indicates one or more first subbands that pass a channel access; and
determining, by the terminal and based on the channel indication signal, the one or more first subbands that pass the channel access;
wherein the channel indication signal comprises downlink control information (DCI), and at least one information field in the DCI indicates the one or more first subbands that pass the channel access.

6. The method according to claim 5, wherein a designated information field of the DCI comprises first indication information for explicitly indicating the one or more first subbands.

7. The method according to claim 5, wherein the DCI comprises identification information for representing the one or more first subbands.

8. The method according to claim 5, further comprising:
receiving, from the base station, a correspondence between preset positions at which the DCI is transmitted and preset first subbands; and
determining, based on the correspondence, the one or more first subbands.

9. A device, comprising:
one or more processors; and
a memory for storing instructions executable by the one or more processors;
wherein the one or more processors are configured to:
receive a channel indication signal from a base station, wherein the channel indication signal indicates one or more first subbands that pass a channel access; and
determine, based on the channel indication signal, the one or more first subbands that pass the channel access;
wherein the channel indication signal comprises downlink control information (DCI), and at least one information field in the DCI indicates the one or more first subbands that pass the channel access.

10. The device according to claim 9, wherein a designated information field of the DCI comprises first indication information for explicitly indicating the one or more first subbands.

11. The device according to claim 9, wherein the DCI comprises identification information for representing the one or more first subbands.

12. The device according to claim 9, wherein the one or more processors are further configured to:
receive, from the base station, a correspondence between preset positions at which the DCI is transmitted and preset first subbands; and
determine, based on the correspondence, the one or more first subbands.

13. A device, comprising:
one or more processors; and
a memory for storing instructions executable by the one or more processors;
wherein the one or more processors are configured to perform the channel indication method according to claim 1.

14. A non-transitory computer-readable storage medium having stored therein instructions that perform the channel indication method according to claim 1.

15. A non-transitory computer-readable storage medium having stored therein instructions that perform the channel indication method according to claim 5.

* * * * *